Patented Sept. 20, 1949

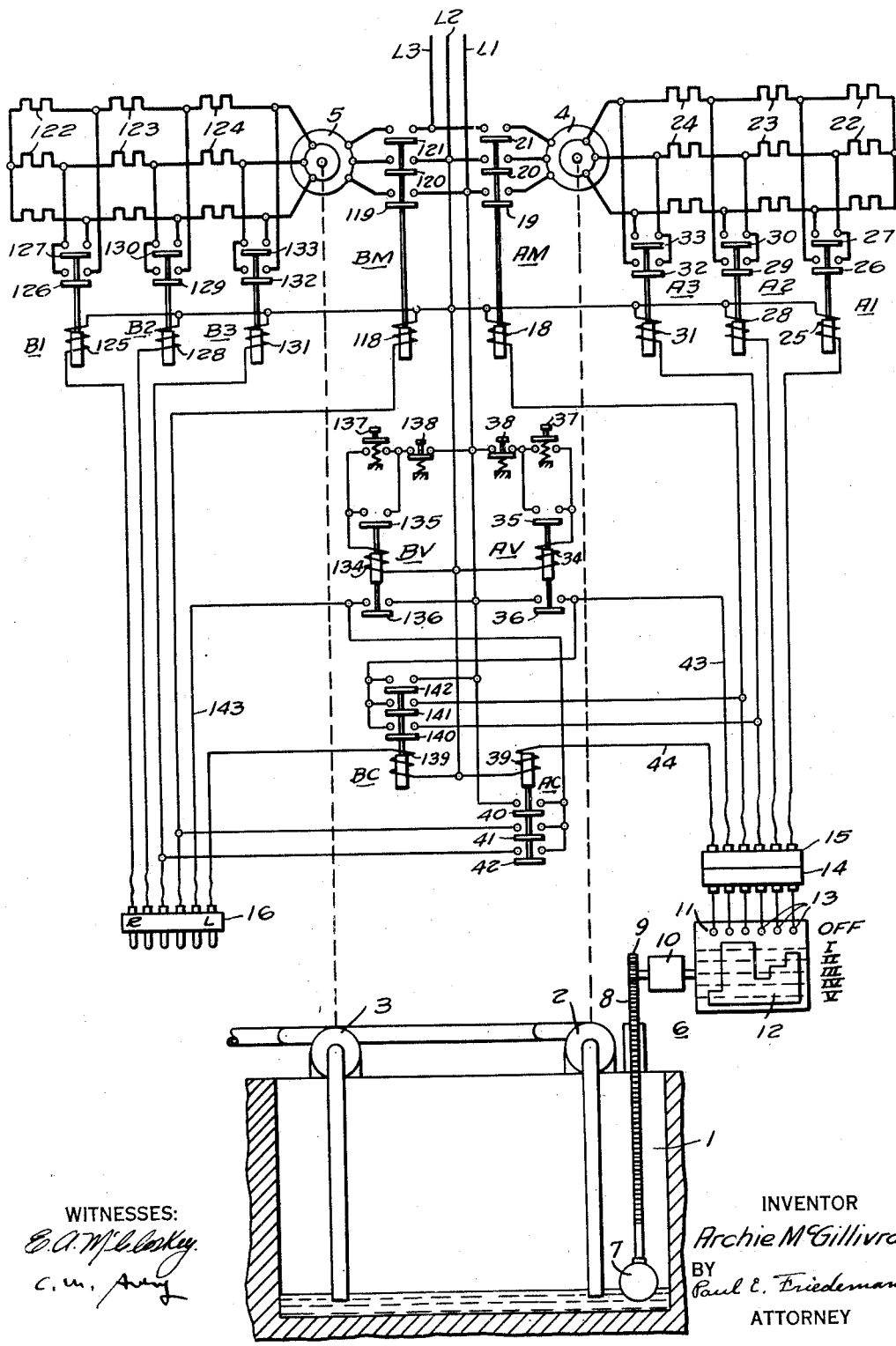

2,482,496

UNITED STATES PATENT OFFICE 2,482,496

SEQUENTIAL CONTROL FOR ELECTRIC MOTORS

Archie McGillivray, Baltimore, Md., assignor to Westinghouse Electric Corporation, East Pittsburgh, Pa., a corporation of Pennsylvania Application May 21, 1946, Serial No. 671,206

4 Claims. (Cl. 318—102)

My invention relates to electrically operated pump installations.

It is among the objects of the invention to provide a control system for a plurality of electric motors associated with a corresponding plurality of pumps which is characterized by an improved economy of performance and permits reducing the wear of the individual pump units by permitting any desired distribution of such wear among the individual units of the installation.

According to my invention, I provide an electric pump installation with two or more individually controllable pumps and pump motors, and control these motors by means of a level-responsive contact device in such a manner that within a given range of changes in level only one of these motors is in operation at a controlled speed which is automatically increased as the contact device passes progressively from its off condition through a plurality of intermediate conditions, while the one or several other motors are additionally operated, preferably at a given high speed, when the switching device reaches a given limit position corresponding to a predetermined level.

According to another feature of my invention and in conjunction with the foregoing multiple motor control system, I provide the equipment with selective contact means which permit any one of the pump units to be chosen for variable speed operation under normal operating conditions, thereby rendering it possible to distribute the wear over all available motors and permitting at any time a switching over from one to another motor when a repair or replacement in one of the units is required.

According to a more specific feature of my invention, the different motor control systems are substantially similar to one another and preferably provided with wound-rotor motors whose speed is controlled by relays which sequentially change the resistance in the rotor circuit of these motors. The level-responsive contact device is so designed that the sequential speed-controlling operation affects only the one selected motor that operates during normal changes in level, while the relays of the other motor or motors are so controlled that the resistance of the respective rotor circuits is always at a minimum when these motors are additionally set into operation.

The invention will be more fully understood from the following description of the embodiment illustrated in drawing.

The drawing represents the circuit diagram of a control system for two electrically driven pumps. A sump, for instance, for a sewage disposal system is denoted by 1. Pumps 2 or 3 capable of individual operation are provided in order to maintain the sewage level in sump 1 at a given minimum. These pumps are driven by respective electric motors 4 and 5 both consisting of alternating-current motors of the wound-rotor type. A level-responsive contact unit, denoted as a whole by 6, is equipped with a float 7 for actuating through a rack 8, a gear 9 and a gear transmission 10, the drum 11 of a control switch. The drum 11 is schematically illustrated in developed form. It is equipped with a contact segment 12 to cooperate with a group of contact fingers such as those denoted by 13. The drum contactor has an off position, four intermediate sequential positions denoted by I, II, III, IV, and a last position denoted by V.

The contact fingers 13 of the contactor are connected to a coupling unit 14 which is shown to be in engagement with a plug unit 15 but at the choice of the attendant may instead be coupled with another plug unit denoted by 16. The two plug units 15 and 16 are connected with the control systems for motors 4 and 5 respectively in the manner described below. It should be understood that the plug type coupling just mentioned serves as a contact means for selecting the one motor that is to operate at different speeds at low levels within the range determined by the off position and the position IV of the float switch 6. Consequently, the plug type devices may be replaced if desired by selective contact means of different type.

The motors 4 and 5 are energized from the three mains L1, L2 and L3 of an alternating-current line under control by a line contactor AM and BM, respectively. The control coil 18 of contactor AM actuates three contacts, 19, 20 and 21. The secondary or rotor circuit of motor 4 is equipped with three groups of resistors denoted by 22, 23 and 24, respectively. An accelerating relay A1 with a control 25 and two contacts 26 and 27 permits short circuiting the resistor group 22. Another accelerating relay A2 has a control coil 28 and two contacts 29 and 30 for short circuiting the resistors 23. A third accelerating relay A3 permits shorting the resistors 24 by a control coil 31 which, when energized, closes two contacts 32 and 33.

The relay system of motor 4 is further equipped with a low voltage relay AV and a control relay AC. Relay AV has a voltage coil 34 for actuating two contacts 35 and 36 and is connected in circuit with a normally open start contact 37 and a normally closed stop contact 38. The coil 39 of control relay AC actuates three contacts 40, 41 and 42 only when the float switch 6 is in position V and thereby connects the float switch with the relay control system of the motor 5. The control system of motor 5, contains also three accelerating relays B1, B2, B3, a low voltage relay BV and a control relay BC. These relays correspond to the relays A1, A2, A3, AV and AC of the above-described control system for motor 4. Hence, the individual elements in the control system for motor 5 are designated in the drawing by reference numerals which correspond to those applied to the respective elements of the control system of motor 4 except that the prefix 1 has been added. For instance, the contacts 119, 120 and 121 of line contactor BM in the control system of motor 5 correspond in design, operation and circuit connection to the respective contacts 19, 20 and 21 of contactor AM for motor 4.

As long as the start contacts 37 and 137 are open, as illustrated, both motor control systems are deenergized so that neither motor is operated. When contact 37 is closed, coil 34 is energized so that the low voltage relay AV closes a self-holding circuit at contact 35 and connects the lead denoted by 43 with main L1 of the power supply. Relay AV, by virtue of its holding circuit, remains picked up when thereafter the contact 37 is released by the attendant. Relay AV drops off only when the line voltage declines below a safe value or when the stop contact 38 is opened. The low voltage relay BV of the second control system is similarly placed in operation by the actuation of start contact 137. With both motor control systems in operative condition, the installation has the following performance in response to changes in sump level.

When the liquid in sump 1 is below a given minimum level, the float switch 6 is in the illustrated off position in which both motors are disconnected from the power line so that both pumps remain at rest. When the level rises so that float switch 6 is placed in position I, the contact segment 12 closes a connection between lead 43 and coil 18 of line contactor AM so that the latter is energized between mains L1 and L2. Line contactor AM picks up and closes the primary circuit of motor 4. Since relays A1, A2 and A3 remain open, the rotor circuit has maximum resistance so that motor 4 runs at minimum speed. When the sump level rises a further extent thus placing the float switch in position II, the contact segment 12 closes an additional connection between lead 43 and coil 25 of relay A1. As a result, relay A1 short circuits the resistors 22 and reduces the resistance in the secondary motor circuit for increasing the speed of the motor. When the float switch 6 assumes the position III, the coil 28 of relay A2 is connected with lead 43 and causes the resistance 23 to be supported for a further increase in motor speed. In position IV of switch 6, lead 43 is also connected with coil 31 so that relay A3 shorts the resistors 24, thus adjusting the motor 4 for maximum speed. A still further rise in level causes the float switch to assume the position V. In this position, the lead 43 is connected by contact segment 12 with a lead denoted by 44 which connects coil 39 of control relay AC to the power supply so that contacts 40, 41 and 42 are closed. This establishes an energizing circuit through coil 118 of line contactor BM and through coil 131 of relay B3. Thus the motor 5 receives primary energization with all of its secondary resistors 122, 123 and 124 shorted by the contacts 132 and 133 of relay B3. Consequently, motor 5 now starts running at full speed. It will be obvious that, if desired, additional motors and appertaining relay systems of similar design can be provided to be operated sequentially at maximum speed if the float switch 6 is given additional positions.

If the plug 15 is removed and instead the plug 16 connected with the unit 14, the installation will operate in the same manner as described above except that now the motor 5 is operated within the range of changes in level corresponding to the range of adjustment between the off position and position IV of the float switch 6, while the motor 4 is additionally operated at full speed only when switch 6 reaches the position V. By a properly timed interchange between the two motors, the load over a given length of time can be about equally distributed along the two motors so as to expose them to approximately equal wear. The invention permits also a switching over to the other motor if an inspection, repair or replacement in one of the systems becomes necessary. It will also be noted that by virtue of the separately operating start and stop contacts each motor can be disconnected from the power supply for purposes of the just-mentioned kind.

While I have illustrated and described an embodiment of my invention in conjunction with two motors of the wound rotor type, it will be understood by those skilled in the art that electric motors of different kinds are likewise applicable for the purposes of my invention and that the details of the appertaining control systems can be varied in many respects without departing from the principles of the invention and within the essential features set forth in the claims annexed hereto.

I claim as my invention:

1. A pump motor control system comprising two pump motors, two multiple relay circuits connected with said motors respectively for controlling them to operate at different speeds, float switch means having an off position at minimum level, a plurality of sequential positions at intermediate levels and another sequential position corresponding to a given maximum level, selective contact means attached to said relay circuits for connecting them to said float switch means so as to cause a selected one of said motors to operate at progressively increasing speeds when said float switch mean passes progressively from said off position through said intermediate positions and to cause the other motor to operate in addition to said selected motor at a given speed when said float switch means is in said other position.

2. A pump control system, comprising a wound rotor pump motor having a secondary resistance circuit and a group of relays for sequentially varying the resistance of said circuit to thereby control the motor speed, a second pump motor having relay means for controlling it to operate at a given speed, float switch means having an off position at minimum level, a plurality of sequential positions at intermediate levels and another sequential position corresponding to a given maximum level, said float switch means being connected with said group of relays for causing them to operate said wound rotor motor at increasing speed when said float switch means progresses from said off position through said plurality of intermediate positions and ring connected with said relay means for causing said other motor to operate additionally at a fixed speed when said float switch means reaches said other position.

3. A pump control system, comprising two wound rotor pump motors each having a secondary resistance circuit and a group of relays for sequentially varying the resistance of said circuit to thereby control the motor speed, float switch means having an off position at minimum level, a plurality of sequential positions at intermediate levels and another sequential position corresponding to a given maximum level, selective contact means attached to said respective groups of relays for connecting them to said float switch means so as to cause a selected one of said motors to operate at progressively increasing speeds when said float switch means passes progressively from said off position through said intermediate positions and to cause the other motor to operate at a given high speed in addition to said selected motor when said float switch means is in said other position.

4. A pump control system, comprising two wound rotor pump motors each having a secondary resistance circuit and a group of relays for sequentially varying the resistance of said circuit to thereby control the motor speed, float switch means having an off position at minimum level, a plurality of sequential positions at intermediate levels and another sequential position corresponding to a given maximum level, selective contact means attached to said respective groups of relays for connecting the relays of a selected one of said groups to said switch means when the latter is in said respective intermediate positions and connecting several relays of the other group to said switch means when the latter reaches said other position whereby the motor appertaining to said selected group is operated at stepwise increasing speed as said switch means progresses from said off position through said intermediate positions while said other motor runs additionally at high speed when said maximum level is exceeded.

ARCHIE McGILLIVRAY.

REFERENCES CITED

The following references are of record in the file of this patent:

UNITED STATES PATENTS

| Number | Name | Date |
| --- | --- | --- |
| 869,352 | Day | Oct. 29, 1907 |
| 872,298 | Leonard | Nov. 26, 1907 |
| 1,537,375 | Prescott et al. | May 12, 1925 |
| 1,578,925 | Seeger | Mar. 30, 1926 |
| 1,761,748 | Runner | June 3, 1930 |
| 1,780,380 | Durdin | Nov. 4, 1930 |
| 1,954,142 | Moffett | Apr. 10, 1934 |
| 2,042,169 | Cook | May 26, 1936 |